OPERATOR POSITION EQUIPMENT FOR TELEPHONE SYSTEMS

Filed Sept. 13, 1963 2 Sheets-Sheet 1

INVENTORS: E. W. SCHNEIDER
M. S. SCHOEFFLER
BY: [signature]
ATTORNEY 3,294,922

OPERATOR POSITION EQUIPMENT FOR TELEPHONE SYSTEMS

Edward W. Schneider, Murray Hill, and Max S. Schoeffler, Morris Township, Morris County, N.J., assignors to Bell Telephone Laboratories, Incorporated, New York, N.Y., a corporation of New York Filed Sept. 13, 1963, Ser. No. 308,725
8 Claims. (Cl. 179—27)

Figure 1:
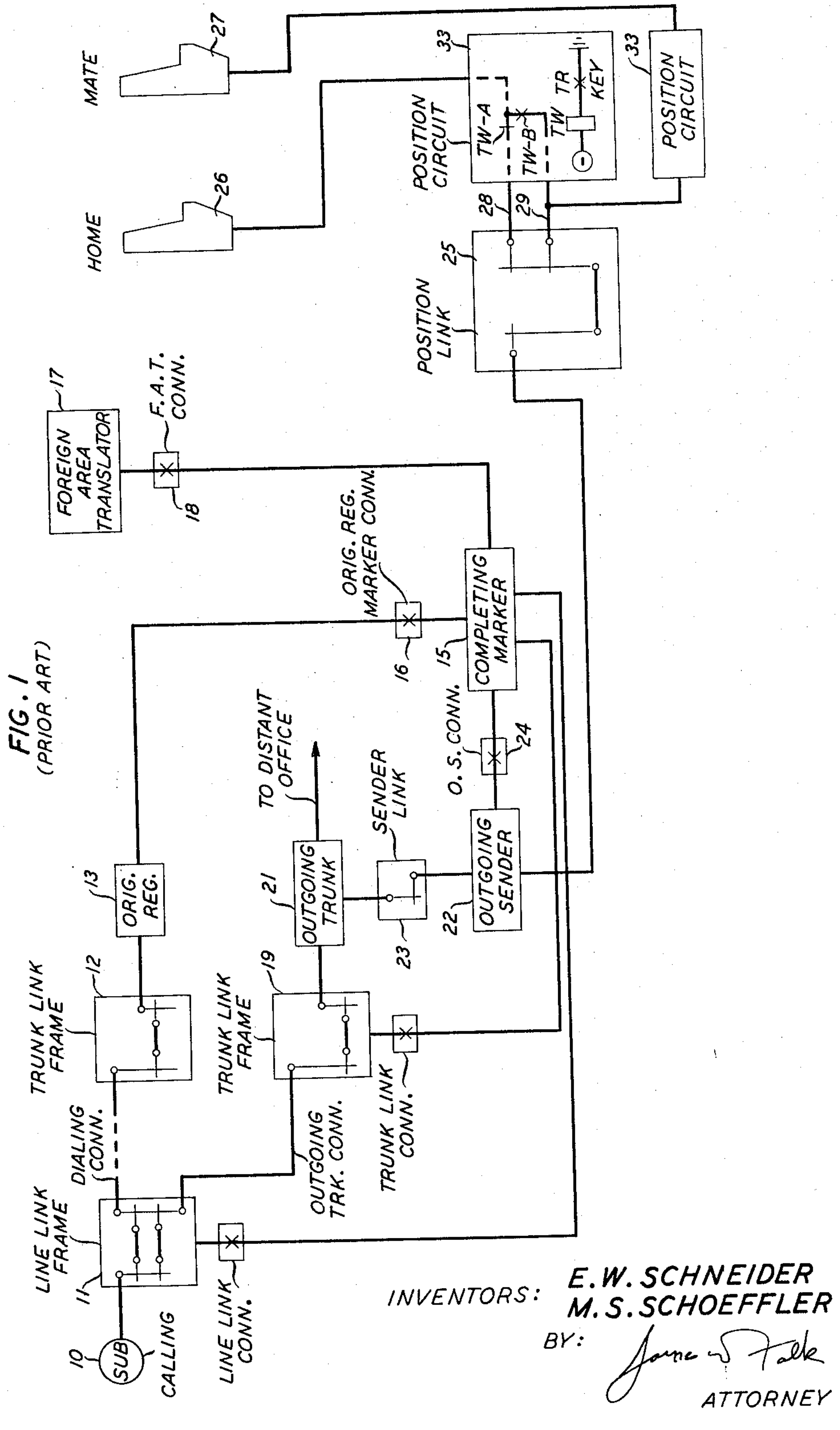
FIG. 1 (PRIOR ART)

This invention relates to operator position equipment for telephone systems and, more particularly, to such equipment wherein overlap operation is utilized.

Despite the increased tendency to require the telephone customer to establish or dial his own call connections even for long distance calls, there are still a number of instances in which an operator must be brought into a call for furnishing assistance to the customer. One exemplary situation is on a person-to-person call where the calling party is not to be charged unless a specified person is available at the called location. In some existing systems, the calling party is required to prefix his dialing of a person-to-person call with an initial "0." This prefix digit causes an operator position to be connected to the call for enabling the operator to obtain the necessary information from the calling party. The operator thereafter monitors the call and causes the automatic accounting equipment to begin charging on the call when she ascertains that the designated person has, in fact, answered.

In present systems, it has been a common practice for each operator position to be twinned with an adjacent position so that the operator can serve a second call at the adjacent position on an overlap basis when she determines that there will be no occasion for her to re-enter on a first call for a given period of time. To serve the second call, the operator presses a transfer key at her position and thereby effects the transfer of her headset from her usual, or home, channel to the adjacent, or mate, channel associated with the adjacent position and the second call.

It is an object of our invention to enable operators to serve calls on an overlap basis more quickly and efficiently, as well as to provide better service.

It is a further object of our invention to provide improved attendant position equipment for call monitoring.

These and other objects of our invention are attained in specific embodiments thereof by apparatus which permits the operator to listen to two simultaneous conversations and to have the capability of talking on either at will.

Specifically, in one specific embodiment of our invention the operator is equipped with a headset having two receivers, one for each ear, and one transmitter. Normally, the operator is connected, at one receiver only and at the transmitter, through her position circuit to one of the channels, that is, a home or a mate channel, as in prior equipment. A control switch, however, provides the operator with the option of listening to the two separate channels, the home and mate channels, simultaneously, without being able to talk to either. In this illustrative embodiment, auxiliary channels are provided from both the home and mate input channels to the position circuit, the auxiliary channels being distinct from the position circuit and each is connected individually to one of the headset earphones. Control relays, which are activated under control of keys and/or switches at the operator position, determine the connection of the earphones to the auxiliary channels and, alternatively, to any one of the regular channels through the position circuit, as the attendant desires.

The speech from the home and mate channels is advantageously passed simultaneously through limiting amplifiers in the auxiliary channels to assure that the monitored speech will be heard at approximately the same loudness for all calls served over the home and mate channels within a wide range of the talker speech level and losses over the connecting transmission facilities.

Additionally, the equipment in accordance with our invention provides various visual indicators for the operator position. Advantageously, the first indicators are connected to the auxiliary channels for providing visual indications to the operator of the sound levels or speech activity on the two channels. This permits an operator to recognize activity on one channel even when she is serving a call on the other channel at that time. As a consequence of recognizing such activity, the operator can activate position keys for operating the aforementioned control relays which either connect her headset receivers into a dual listening mode so as simultaneously to monitor the speech on both channels, or connect her headset transmitter and a receiver directly to the other channel for immediately serving the party who may be requesting service thereon.

The second visual indicators, in accordance with our invention, inform the operator of which channel, home or mate, is connected to her home position circuit and also, by the intensity of the light, whether, in fact, at that instant she is nominally disconnected from the position circuit and connected simultaneously to both the home and mate channels through the auxiliary channels. It should be noted that an attendant in systems in accordance with our invention is always nominally connected to one channel or the other through the position circuit. Thus, if an attendant is connected to the home channel and, on finishing speaking to that channel, goes into the dual listening mode so as simultaneously to listen to both the home and mate channels, she nevertheless remains nominally connected to the home channel. When she returns to the speaking mode, her one earphone and transmitter will be connected again to the home channel. If she wishes to switch the nominal connection from the home to the mate channel, the operator must operate a transfer key to change her nominal connection to the mate channel and may do so even while still remaining in the dual listening mode.

Accordingly, these second visual indicators advise her of her actual and/or nominal connection through the position circuit and also whether she is in the dual listening mode.

We have found that by virtue of our invention operators are readily made aware of conversations on the two distinct channels and may monitor them simultaneously. After doing so, an operator can transfer from one to the other of the channels for two-way communication, as required. In this specific embodiment of our invention, the operator has the option of either nominally disconnecting her headset from one channel when she is connected to the other channel through the position circuit and conversing therethrough or, alternatively, of allowing an attenuated speech signal to be present in her other receiver from the disconnected channel.

It is a feature of our invention that an attendant position provide distinct connections from two channels to the separate earphones of the operator headset to allow simultaneous connection to and listening on both channels.

It is another feature of our invention that two separate paths be provided from the incoming channels to the attendant headset, a first path being through the position circuit and including one or the other of the earphones and the transmitter and a second path being distinct from the position circuit and including both earphones.

It is a further feature of our invention that control circuitry be provided whereby, under the attendant control, the attendant may be connected either in the dual listening mode to both channels or to one or the other of the channels for two-way communication.

It is a still further feature of our invention that visual indicators be provided to advise the attendant of speech activity on the channels and also of which channel she is actually or nominally connected to, as through the position circuit, and whether she is, in fact, thus connected or is in the dual listening mode.

It is yet another feature of our invention that an attenuated speech signal may be present at an attendant earphone when the other attendant earphone and the transmitter are connected for two-way communication to one of the channels.

An advantage of our invention is that it may be incorporated into existing telephone systems without necessitating substantial changes in the switching equipments or impairing established procedures for serving telephone calls.

Figure 2:
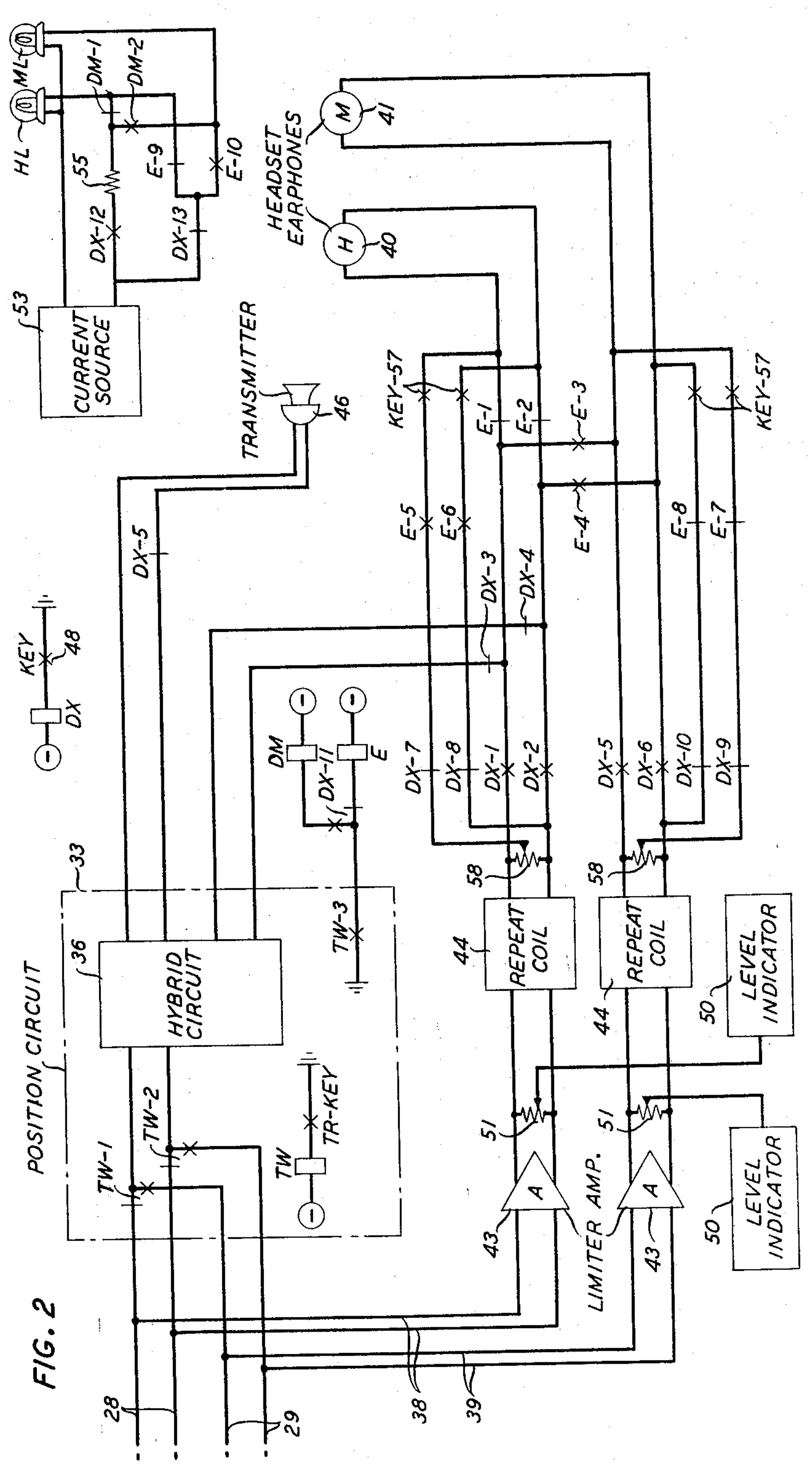

A complete understanding of these and other advantages and features of our invention may be gained from consideration of the following detailed description, together with the accompanying drawing in which:

FIG. 1 is a schematic block diagram of prior art equipment showing the connection of operator positions through the position circuit to the telephone system; and FIG. 2 is a schematic representation of a specific illustrative embodiment of our invention which may be incorporated in the system of FIG. 1.

Turning now to the drawing, FIG. 1 is a schematic block diagram of an existing telephone system in which our invention may be employed. For purposes of this description we shall assume that the calling subscriber 10 desires to make a person-to-person call. We shall ignore in considering the operation of this system and the actions of the attendant, or operator, the association of this system with automatic message accounting equipment for timing and charging for the call.

The subscriber desiring to place a person-to-person call will prefix the number he dials with an initial "0" indicating that operator assistance is required for this call. The dialing connection is set up through the line link frame 11 and trunk link frame 12 to the originating register 13 in the normal manner. When the dialing is completed, the register 13 connects to an idle completing marker 15 through an originating register marker connector 16. The register further signals the marker that this is an operator assistance call.

The marker 15 will refer this call to the foreign area translator 17 through the connector 18 for the desired routing information and then establish an outgoing trunk connection by establishing a connection through the line and trunk link frames 11 and 19 and the outgoing trunk 21 to the distant office. At the same time, marker 15 will attach the outgoing sender 22 to the outgoing trunk 21 through the sender link 23. Information necessary to complete the call is now transferred from the marker 15 to the sender 22 via the outgoing sender connector 24.

In this type of system, the seizure of the outgoing sender 22 will signal the position link 25 to connect an idle position, such as position 26 or position 27 onto the call connection. When an idle position has been found, the out-pulsing by the sender 22 to the distant office (not shown) is started, and a tone signal alerts the calling subscriber and the operator so that the calling party can pass the necessary information to the operator, such as identifying the party to whom the calling party wishes to speak.

Priorly, each attendant position would have a connection to it from the position link 25, as through paths 28 or 29 and position circuit 33, the position link distributing calls evenly over groups of positions. Each position could, however, be teamed with an adjacent position. Thus, if a long delay is encountered on a call during which the operator can only sit and wait, and a signal at her position indicates to the operator that other calls are to be served, the operator can effectively transfer her telephone from her "home" position to the neighboring, or "mate," position to serve a second call. To accomplish this, the operator presses a TR key depicted in the position circuit 33 of FIG. 1 but which may actually be physically at her position itself. The operation of key TR causes the operation of the transfer relay TW which in turn switches a hybrid circuit (not shown in FIG. 1) between the lines 28 and 29 to effectuate the transfer. This has been shown schematically in FIG. 1 by the transfer contacts TW–A and TW–B of the transfer relay TW. Thus, the operator at position 26 can disconnect her headset from position 26 and effectively connect it to the neighboring position by operation of the position circuit 33. During this interval, the first call is held by the home position circuit 33.

Turning now to FIG. 2, in accordance with our invention provision is made so that both the "home" and "mate" channels are brought directly to the one operator position for monitoring purposes and are individually connected to the two receivers, respectively, of her headset. In this way, while a first call is being monitored the operator can readily make herself available to receive another call and can simultaneously keep track of possible oral requests on both calls so that she will notice and respond to requests for assistance (e.g., to leave word of a call that could not be completed person-to-person) from the customer. Further, the operator can start the requisite timing accurately on both calls and handle the other necessary accounting and charging procedures, not detailed herein.

In FIG. 2, the communication channels 28 and 29 extend from the position link 25 of FIG. 1 through the position circuit 33 and, under control of the transfer contacts TW–1 and TW–2 of the transfer relay TW to the hybrid circuit 36, as in the arrangements of the prior systems. In accordance with our invention, however, we provide an additional channel 38 which connects the "home" channel 28 to the "home," or H, earphone 40 of the operator headset and a similar channel 39 which connects the "mate" channel 29 to the "mate," or M, earphone 41. Included in each channel is a limiter amplifier 43, a repeat coil 44, and other transmission components, such as loss pads, as are known in the art and need not concern us in an understanding of this invention. Also included in the paths 38 and 39 are contacts of the control relays, as discussed further below.

One output pair of the hybrid circuit 36 is connected, as discussed below, through break contact DX–5 of the dual listening mode relay DX of FIG. 2 to the transmitter 46 of the operator headset. The other output pair of the hybrid circuit 36 is connected, through appropriately closed contacts of the control relays, to one or the other, or neither, of the operator headset earphones 40 and 41.

In accordance with our invention in this specific embodiment thereof only two control relays need be added to the existing equipment to control the appropriate connections of earphones 40 and 41 and transmitter 46 of the operator headset. These are the dual listening mode control relay DX and the earphone control relay E of FIG. 2. A third control relay DM of FIG. 2 is also provided in this embodiment as a dimmer control relay but is concerned solely with the position indicating lights HL and ML. These lights, as well as the speech channel indicators 50, will be discussed below apart from the speech channels themselves.

The interconnection of the various elements of this specific embodiment of our invention can best be understood by considering the operation of our circuit in use by the operator. Initially, the operator is connected solely to the home channel 28, i.e., her transmitter 46 and H earphone 40 are connected through the hybrid circuit 36 to the channel 28, the transfer and control relays TW, DX and E being unoperated at this time. The path from the H earphone 40 is through the normally closed contacts E–1, E–2, DX–3 and DX–4 to the hybrid circuit 36; the other paths are believed obvious. At this time her other earphone, the M earphone 41, is not connected to the hybrid circuit 36 due to normally open contacts E–3, E–4. Further, the two earphones are disconnected from the additional speech channels 38 and 39 due to the normally open contacts DX–1, DX–2, and DX–5, DX–6.

Let us assume now that the operator receives an indication of speech activity on channel 29, as discussed further hereinafter, and decides to go into the dual listening mode wherein she can simultaneously monitor both speech channels. To do this she activates the locking key 48 which causes energization of the dual mode relay DX. Operation of relay DX disconnects the operator headset from the hybrid circuit 36 at contacts DX–3 and DX–4 and instead connects the earphones 40 and 41 individually to the auxiliary channels 38 and 39, provided in accordance with an aspect of our invention. In addition, transmitter 46 is disconnected from hybrid circuit 36 by the opening of contact DX–5. The earphones 40 and 41 are connected through the repeat coils 44 and limiter amplifiers 43 to the respective auxiliary channels 38 and 39 by closure of the pairs of contacts DX–1, DX–2 and DX–5, DX–6.

If the operator, in the dual listening mode, determines that she should converse on the home channel 28, she need only release the key 48 to re-establish the prior conditions.

If the operator, while connected to the home channel 28 through the position circuit, desires to transfer to the mate channel, she depresses the TR key, which in this simplified depiction may be assumed to be a locking key, in the position circuit 33. As in prior systems, this causes operation of the TW transfer relay which effects the transfer of the input of the hybrid circuit 36 from the home channel 28 to the mate channel 29 at the transfer contacts TW–1 and TW–2. Energization of the TW relay also causes energization of the earphone control relay E through a path including the now closed contacts TW–3 and the break contact of transfer contact DX–11. Energization of relay E causes connection of the mate earphone 41 to the hybrid circuit 36 through the contacts E–3, E–4, DX–3 and DX–4. At the same time, the opening of contacts E–1, E–2 removes the home earphone 40 from the circuit.

Energization of the dual listening mode relay DX while the operator is connected to the mate channel through position circuit 33 will cause the same connections as priorly set forth to be established; in this instance, however, relay E is also released, by opening of the break contact of transfer contact DX–11. This causes the reconnection of the home and mate earphones to their respective auxiliary channels by release of the contacts E–1, E–2 and E–3, E–4 to their normal conditions.

In accordance with other aspects of our invention, various visual indicators are provided. Specifically, we have found it advantageous to provide visual level indicators 50 which indicate syllabic speech activity on the channels 28 and 29. Specifically, the indicators 50 may include indicator tubes, such as those known commercially as the EM84 indicator tube, in which bars of light expand and contract in size in response to the speech activity on the line. The indicators 50 are connected to resistance pads 51 connected across the auxiliary speech channels 38 and 39.

Additionally, in accordance with our invention, the operator is always at least nominally connected, through the position circuit, to either the home or the mate channel, even though, at a given instance, she may be disconnected from the position circuit and her earphones connected to both of the channels 28 and 29 simultaneously through the auxiliary channels 38 and 39. We have, therefore, found it advantageous to include a visual indication of the channels to which the operator is connected and whether or not she is presently in the dual listening mode. This circuitry includes the indicator lamps HL and ML, the electrical current source 53 and various contacts of the control relays DX, E and DM.

When the operator is connected in the normal manner to the home channel 28 through position circuit 33, none of the latter relays is operated and the light HL is lit at full intensity over a path including current source 53, light HL, contacts E–9 and DX–13 to source 53. If now the operator goes into the dual listening mode, in accordance with an aspect of our invention, the HL light remains lit but at a reduced intensity, the prior energizing path being interrupted at now open contact DX–13 and a parallel path being provided through contacts DM–1, dimming resistor 55, and contact DX–12.

If the operator were now to transfer her normal connection from the home to the mate channels, while still remaining in the dual listening mode, she would close key TR without releasing key 48. This causes energization of relay TW and closure of contacts TW–3 providing a path now, not for energization of relay E, but for energization of dimmer control relay DM as transfer contacts DX–11 are operated. Accordingly, contacts DM–1 and DM–2 in the light control circuit are operated to open the energizing path for light HL and providing an energizing path for light ML from source 53, light ML, contact DM–2, dimmer resistor 55, contact DX–12 to source 53.

Release of the key 48 to take the operator out of the dual listening mode and return her to a normal connection will now return the operator to the mate channel 29 through the position circuit 33, as explained above. Release of the DX relay will cause the release of the dimmer control relay DM and concomitant energization of relay E, by operation of the transfer contacts DX–11. The dimmed energizing path for light ML through contacts DM–2 is accordingly opened, but is replaced by a full intensity path through now closed contacts E–10 and contacts DX–13.

In this manner the operator, by observing which of her lights HL or ML is lit and the degree of brightness or intensity, can tell not only to which channel her transmitter and headset are connected through the position circuit connections but also whether she is cut through on that connection or is in the dual listening mode involving the auxiliary channels.

We have also found that some operators find it advantageous even when connected normally through the home or mate channel to have an attenuated oral indication of the activity on the other channel. Accordingly, we provide, in accordance with another aspect of our invention, under control of locking key 57 additional paths, through contacts DX–7, DX–8 and DX–9, DX–10, which will allow a low energy speech signal to be heard in the other earphone when the operator is in normal communication through the position circuit, and thus when the dual listening mode relay DX is not energized. Make contacts E–5, E–6 and break contacts E–7, E–8 control the earphone to which the attenuated signal is transmitted. The signal is received from voltage divider 58 connected across the outputs of the repeat coils 44.

It is also to be understood that the above described arrangements are illustrative of the application of the principles of the present invention. Numerous other arrangements may be devised by those skilled in the art without departing from the spirit and scope of the invention.

What is claimed is:

1. In a telephone system, an attendant position including a headset having a first and a second receiver and a transmitter, first and second communication channels, first means for connecting one of said receivers and said transmitter to only one of said channels, second means distinct from said first means for connecting said receiver simultaneously to individual ones of said channels, and control means for establishing one of said first and second means.

2. In a telephone system, a position circuit, an attendant position comprising a headset having a first and a second earphone and a transmitter, a first and a second channel, means in said position circuit for alternatively connecting said first channel to said first earphone and said transmitter and said second channel to said second earphone and said transmitter, a first auxiliary channel connected to said first channel, a second auxiliary channel connected to said second channel, and control means for disconnecting said connections through said position circuit between said first and second channels and said headset and for simultaneously connecting said first auxiliary channel to said first earphone and said second auxiliary channel to said second earphone.

3. In a telephone system, the combination as set forth in claim 2 further comprising means connected to each of said auxiliary channels for providing an attenuated signal to one of said earphones when the other of said earphones is connected to one of said first and second channels by said means in said position circuit.

4. In a telephone system, the combination as set forth in claim 2 further comprising a first and a second lamp indicator, means for energizing said lamp indicators to indicate the channel to which said headset is connected through said means in said position circuit, and means for modifying said energizing means to indicate that said earphones are connected to said auxiliary channels.

5. In a telephone system, an attendant headset including a pair of earphones and a transmitter, a pair of speech channels, means including a first key means and a first relay for determining the connection of one of said channels to one of said earphones and said transmitter, means including a second relay controlled by said first relay for determining the connection of the other of said channels to said other earphone and said transmitter, and means including a second key means and a third relay for determining the connection of said channels each to one of said earphones simultaneously and for the disconnection of said transmitter from said channels.

6. In a telephone system, an attendant headset including a first earphone, a second earphone, and a transmitter; a pair of speech channels; a hybrid circuit having an input and a pair of outputs; means including a first key means and a first relay for determining the connection of said channels to said hybrid circuit input; means including a second relay controlled by said first relay for determining the connection of one of said earphones to one of said hybrid circuit outputs; means for connecting said transmitter to the other hybrid circuit output; and means including a second key means and a third relay for disconnecting said transmitter and said earphones from said hybrid circuit and for connecting said earphones each to one of said channels simultaneously.

7. In a telephone system, the combination as set forth in claim 6 further comprising means including third key means and said second and a fourth relay for providing attenuated speech connections from said channels to said earphones exclusive of said hybrid circuit when said headset is connected to said hybrid circuit.

8. In a telephone system, an attendant headset including first and second earphones and a transmitter; a pair of telephone channels; a hybrid network having an input and a pair of outputs; means including a first key means and a first relay for selectively connecting said channels to said input; means including a second relay controlled by said first relay for selectively connecting any one of said pair of earphones to one of said pair of outputs; means for connecting said transmitter to the other of said pair of outputs; a pair of auxiliary channels, each including an amplifier having an input connected to one of said telephone channels and an output, a repeating coil and a potentiometer connected in parallel to the output of said amplifier; a pair of level indicators each being individually associated with said potentiometer of one of said auxiliary channels for indicating speech frequency signals on the associated one of said telephone channels; means including a second key means, contacts of said second relay and a third relay, and a voltage divider connected to one of said repeating coils for providing an attenuated speech connection from one of said pair of telephone channels to one of said pair of earphones when the other of said pair of earphones is connected to the other of said telephone channels via said hybrid network; means including a third key means for activating said third relay to disconnect said transmitter and said other earphone from said hybrid network outputs; means including contacts of said second and third relays for simultaneously connecting each of said pair of earphones individually at times to said repeating coil of one of said auxiliary channels for concurrently monitoring speech frequency signals on both of said telephone channels; and means including a fourth relay jointly controlled by said first and third relays for signifying which of said telephone channels is connected to said hybrid network input.

References Cited by the Examiner

UNITED STATES PATENTS

| | | | |
|---|---|---|---|
| 1,996,213 | 4/1935 | Phelps ------------ | 179—175.2 |
| 2,294,237 | 8/1942 | McKim ---------- | 179—27(.03) |

KATHLEEN H. CLAFFY, *Primary Examiner.*

WILLIAM C. COOPER, *Examiner.*